Figure 1:
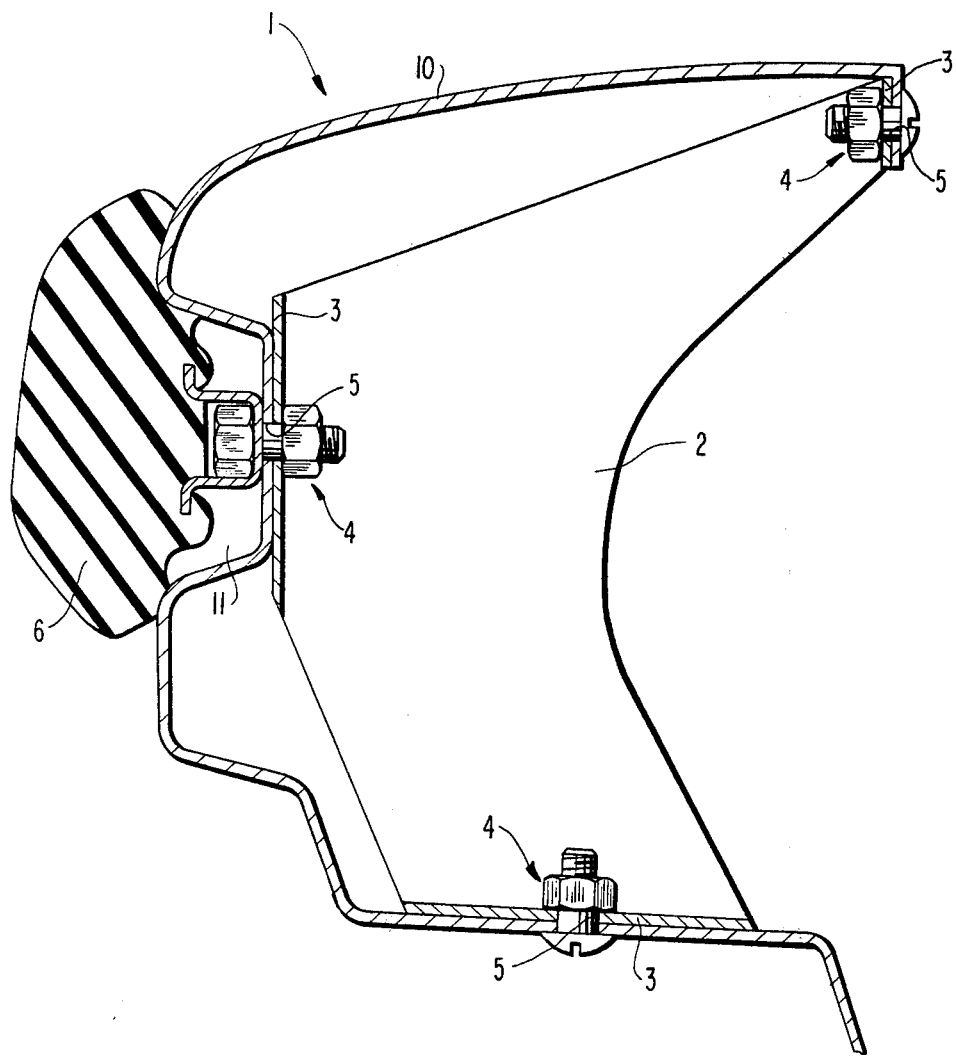

United States Patent [19]

Klie et al.

[11] 4,142,753
[45] Mar. 6, 1979

[54] VEHICLE BUMPER

[75] Inventors: Wolfgang Klie, Korntal; Wolfgang Fischer, Leinfelden; Helmut Weisshappel, Sindelfingen, all of Fed. Rep. of Germany

[73] Assignee: Daimler-Benz Aktiengesellschaft, Fed. Rep. of Germany

[21] Appl. No.: 743,928

[22] Filed: Nov. 22, 1976

[30] Foreign Application Priority Data

Nov. 21, 1975 [DE] Fed. Rep. of Germany ....... 2552184

[51] Int. Cl.² ............................................. B60R 19/04
[52] U.S. Cl. .................................. 293/102; 293/142; 293/120
[58] Field of Search ..................................... 293/60–63, 293/70, 71 R, 72, 69 R, 98, 64, 65, 66, 67

[56] References Cited

U.S. PATENT DOCUMENTS

| | | | |
|---|---|---|---|
| 3,291,516 | 12/1966 | Kavos | 293/71 R X |
| 3,427,063 | 2/1969 | Taylor | 293/98 X |
| 3,529,861 | 9/1970 | Deroubaix | 293/64 X |
| 3,778,093 | 12/1973 | Renner | 293/98 X |
| 3,848,916 | 11/1974 | Hulten | 293/63 X |
| 3,907,351 | 9/1975 | Pozelt et al. | 293/71 R |
| 3,933,387 | 1/1976 | Salloum et al. | 293/71 R |
| 4,073,528 | 2/1978 | Klie | 293/98 |
| 4,079,975 | 3/1978 | Matsuzaki et al. | 293/98 |

*Primary Examiner*—Barry L. Kelmachter
*Attorney, Agent, or Firm*—Craig & Antonelli

[57] ABSTRACT

A vehicle bumper formed by a rearwardly opening U-shaped profile member having arranged therein reinforcements fashioned as vertically arranged ribs extending in the longitudinal direction of the vehicle. The ribs are formed of a metallic material and are individually secured with the bumper which is fashioned from sheet steel.

16 Claims, 2 Drawing Figures

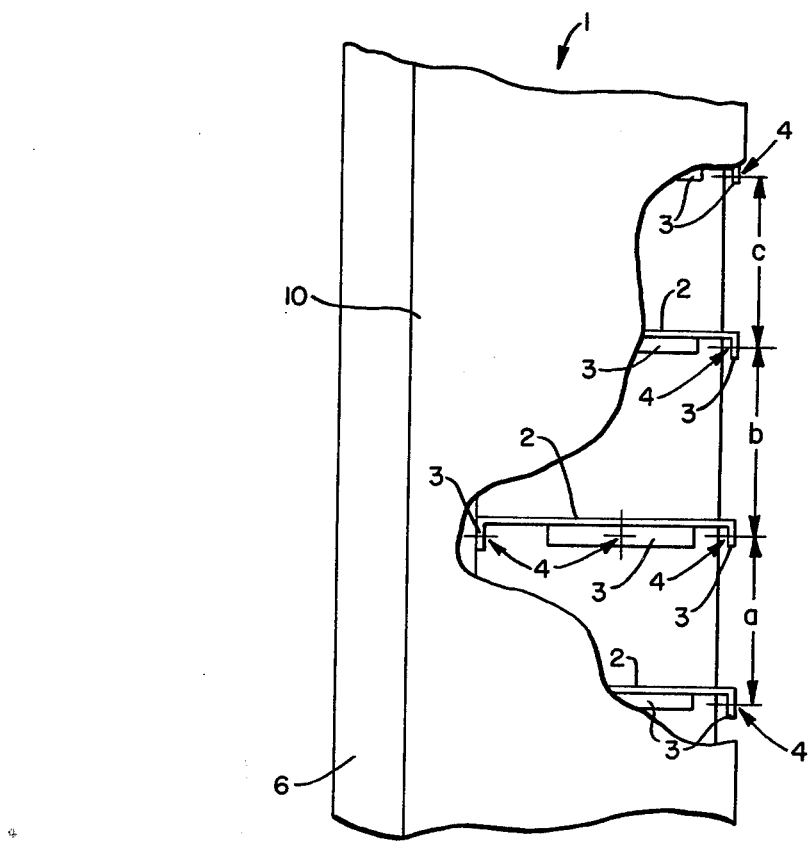

VEHICLE BUMPER

The present invention relates to a bumper arrangement and, more particularly, to an automotive vehicle bumper provided with a rearwardly open U-shaped profile member having reinforcements in the form of vertically upright ribs extending in the longitudinal direction of the vehicle disposed within the profile member.

A bumper construction has been proposed, for example, in Offenlegungsschrift No. 2,023,068, wherein a U-shaped profile member and reinforcements therefor are fashioned of an elastic material with the profile member and reinforcements being arranged in front of a rigid supporting element attached to the automotive vehicle. By virtue of the provision of the reinforcements within the U-shaped profile member, mutually independent pneumatic chambers are formed between the profile member and the rigid supporting element, from which rigid pneumatic chambers air can escape in a controlled manner in the event of a collision. However, this proposed shock-absorbing bumper functions appropriately only if the U-shaped profile member and the reinforcements are fashioned of an elastic material, and the functional principle of this proposed bumper construction cannot readily be transferred to a rigid bumper construction.

Specifically, a rigid bumper is normally joined to supporting portions of an automotive vehicle with the interposition of energy-absorbing components, and must have such a strength that even impact forces concentrated in one point can be absorbed at a certain vehicle speed without a deformation of the profile member. While satisfactory results have been obtained with extruded aluminum profile members which exhibit excellent strength values with favorable weight relationships, a disadvantage of an extruded aluminum profile member resides in the high price of such a profile member and the difficulties which can occur during a surface treatment of the profile members.

The aim underlying the present invention essentially resides in providing a bumper construction having a U-shaped profile which consists of a steel sheet, but which has, when compared to proposed aluminum bumpers, strength values comparable to the aluminum bumpers with a weight which is only slightly greater than the aluminum bumpers.

In accordance with one advantageous feature of the present invention, an automotive vehicle bumper, manufactured from sheet steel, is formed from a rearwardly open U-shaped profile member having reinforcements in the shape of vertically upright ribs extending in the longitudinal direction of the vehicle arranged within the profile member, with the upright ribs consisting of a metallic material and being individually connected with the bumper.

In accordance with a further advantageous feature of the present invention, by virtue of the individual connection of the reinforcing ribs, the spacing can be varied over the length of the bumper, whereby it is possible to improve, in a controlled manner, the denting effect of the bumper with the use of a smaller amount of sheet metal thicknesses for the U-shaped profile member. The connections between the individual reinforcing ribs and the bumper may be provided by screws, rivets, flanging and/or cementing or glueing.

According to another feature of the present invention, the reinforcing ribs may be provided with bevelled edges which rest on an inner wall region of the U-shaped profile member forming the bumper wherein each of the bevelled edges can have at least one opening for receiving the connecting means, for example, a screw or rivet connection.

Additionally, in accordance with the present invention, the esthetic appearance of the bumper can be improved by arranging the connections between the profile member and the reinforcing ribs in a hidden fashion. This hiding of the connection can be achieved, for example, by providing a bumper strip or the like for covering the connection or by arranging the connection in an area not normally visible to observers.

Accordingly, it is an object of the present invention to provide a bumper for automotive vehicles which avoids the aforementioned shortcomings and drawbacks encountered in the prior art.

Another object of the present invention resides in providing a bumper which is fashioned of a sheet steel, but which has strength values comparable to conventional aluminum bumpers with only a slightly greater weight than the aluminum bumpers.

A further object of the present invention resides in providing an automotive vehicle bumper wherein the denting effects of the bumper can be controlled.

Still another object of the present invention resides in providing a bumper which can be readily installed and removed without any difficulties.

These and other objects, features and advantages of the present invention will become more apparent from the following description when taken in connection with the accompanying drawings which show, for the purposes of illustration only, one embodiment of a bumper arrangement in accordance with the present invention, and wherein:

FIG. 1 is a partial cross-sectional view of the bumper in accordance with the present invention; and FIG. 2 is a partial cross-sectional top view of the bumper of FIG. 1.

Referring now to the drawings, wherein like reference numerals are used in both views to designate like parts and, more particularly to FIG. 1, according to this figure, a bumper generally designated by the reference numeral 1, manufactured from a sheet steel, is formed as a U-shaped profile member 10 in which is arranged a plurality of spaced vertical upright reinforcing ribs 2 extending in the longitudinal direction of the vehicle (not shown). The U-shaped profile member 10 opens in the direction of the vehicle and can be joined to supporting parts (not shown) of the vehicle by a conventional energy-absorbing means (not shown).

The reinforcing ribs 2 are manufactured from a metallic material, for example, sheet steel, and are provided with bevelled edges or flanges 3 which rest on inner wall regions of the U-shaped profile member, suitable connection means generally designated by the reference numeral 4, for example, a screw or bolt connection being provided for detachably connecting the ribs 2 to the profile member 10. To accommodate the connection means 4, the bevelled edges 3 and associated regions of the profile member 10 are provided with openings 5 arranged at hidden locations.

As shown in FIG. 1, the reinforcing ribs 2 may be secured at a flanged portion of the profile member 10, at one of the legs of the profile member 10, and in the area of the web portion connecting the respective legs of the U-shaped profile member 10.

The web portion of the profile member 10 may be provided with a recess or groove 11 within the area of the connection of the reinforcing rib 2 with the profile member 10, or the recess or groove 11 may extend over the entire length of the profile member 10. A bumper strip 6 or the like may be provided at the recess or groove 11 for concealing the forward end of the connection means 4. While the profile member 10 is provided with a groove or recess 11 for concealing the connection means, it is understood that the connecting web of the profile member may be substantially planar or have some other suitable configuration with a bumper strip 6 or the like being connected to the forward end of the connection means 4, thereby concealing such connection means.

The specific shape of the reinforcing ribs 2 may be varied so as to achieve the desired control of the displacement of the profile member 10 when the bumper 1 is pushed backward during a collision. Also, the rear edges of the reinforcing ribs 2 may extend so that a cross rail (not shown) provided at the vehicle body can delve into the reinforcing ribs 2 in a controlled manner during a collision. Likewise, as shown in FIG. 2, by varying the spacing a, b, c of the reinforcing ribs 2 with respect to each other along the length of the bumper, the denting effect of the profile member 10 may be controlled.

While we have shown and described only one embodiment in accordance with the present invention, it is understood that the same is not limited thereto, but is susceptible of numerous changes and modifications as known to a person skilled in the art, and we therefor do not wish to be limited to the details shown and described herein, but intend to cover all such changes and modifications as are encompassed by the scope of the appended claims.

We claim:
1. A vehicle bumper arrangement comprising:
a U-shaped profile member opening in a direction toward a vehicle, the U-shaped profile member being formed of sheet steel;
reinforcing means formed as a plurality of individual vertically upright ribs of a metallic material disposed completely within said U-shaped profile member, said individual ribs being spaced from one another with each rib connected to inner wall areas of each leg of the U-shaped profile member so as to interconnect and to reinforce said areas of each leg, each of said individual ribs extending in a longitudinal direction of the vehicle and being constructed as a substantially planar sheet member; and
means for individually detachably connecting each of said plurality of individual ribs to said U-shaped profile member.

2. A bumper arrangement according to claim 1, wherein means are provided on each of said individual ribs for facilitating the connection of said individual ribs to said U-shaped profile member.

3. A bumper arrangement according to claim 2, wherein said facilitating means includes spaced flanged portions provided at each of said individual ribs which rest on the inner wall regions of the U-shaped profile member when said individual ribs are disposed therein, and wherein means are provided in said flanged portions and said U-shaped profile member for accommodating said connecting means.

4. A bumper arrangement according to claim 3, wherein each of said individual ribs are connected to said U-shaped profile member at at least two spaced positions, and wherein each of said positions is disposed in an area of the U-shaped profile member so as to be concealed from view of an observer when the bumper arrangement is mounted on the vehicle.

5. A bumper arrangement according to claim 1, wherein
a groove means is provided for accommodating said connecting means, and wherein means are provided for covering said groove means so as to conceal said connecting means.

6. A bumper arrangement according to claim 5, wherein said covering means is a bumper strip.

7. A bumper arrangement according to claim 1, wherein each of said individual ribs are connected to said U-shaped profile member at at least two spaced positions, and wherein each of said positions is disposed in an area of the U-shaped profile member so as to be concealed from view of an observer when the bumper arrangement is mounted on the vehicle.

8. A vehicle bumper arrangement comprising:
a U-shaped profile member formed of sheet steel including a web portion connecting respective legs of the U-shaped profile member;
reinforcing means formed as vertically arranged individual ribs of a metallic material disposed within said profile member and extending in a longitudinal direction of the vehicle, each of said individual ribs including spaced flanges for facilitating the connection of the respective ribs with inner wall areas of the U-shaped profile member, one of said spaced flanges being arranged so as to engage the web portion of the U-shaped profile member, another of said spaced flanges being arranged so as to engage one of the legs of the U-shaped profile member, and a further of said spaced flanges being arranged so as to engage an inwardly directed flange portion provided on the other of the legs of the U-shaped profile member;
means for individually detachably connecting each of said ribs to said profile member;
a groove means for accommodating said connecting means; and
means for covering said groove means so as to conceal said connecting means.

9. A bumper arrangement according to claim 8, wherein the legs of the U-shaped profile member form an upper and lower portion of the profile member, and wherein the inwardly directed flange portion is provided at an end of the upper portion of the profile member.

10. A bumper arrangement according to claim 9, wherein each of said ribs is formed of a sheet steel.

11. A bumper arrangement according to claim 10, wherein said covering means is a bumper strip.

12. A bumper arrangement according to claim 11, wherein the spacing between the individual ribs varies along the length of the bumper so as to control a denting effect of the U-shaped profile member.

13. A vehicle bumper arrangement comprising:
a U-shaped profile member opening in a direction toward a vehicle, the U-shaped profile member being formed of sheet steel;
reinforcing means formed as a plurality of individual vertically upright ribs of a metallic material disposed within said U-shaped profile member, said individual ribs being spaced from one another with each rib resting on inner wall areas of the U-shaped profile member so as to interconnect said areas, each of the individual ribs extending in a longitudinal direction of the vehicle, the spacing between the individual ribs varies along the length of the bumper so as to control a denting effect of the U-shaped profile member; and means for individually detachably connecting each of said plurality of individual ribs to said U-shaped profile member.

14. A bumper arrangement according to claim 13, wherein each of said individual ribs includes spaced flanges for facilitating the connection of the respective ribs with inner wall areas of the U-shaped profile member, one of said spaced flanges being arranged so as to engage a web portion of the U-shaped profile member, another of said spaced flanges being arranged so as to engage one leg of the U-shaped profile member, and a further of said spaced flanges being arranged so as to engage an inwardly directed flange portion provided on another leg of the U-shaped profile member.

15. A bumper arrangement according to claim 14, wherein the legs of the U-shaped profile member form an upper and lower portion of the profile member, and wherein the inwardly directed flange portion is provided at an end of the upper portion of the profile member.

16. A bumper arrangement according to claim 15, wherein each of said ribs is formed of a sheet steel.

* * * * *